(12) United States Patent
Seto

(10) Patent No.: US 9,030,708 B2
(45) Date of Patent: May 12, 2015

(54) IMPOSITION APPARATUS, IMPOSITION METHOD, AND NON-TRANSITORY COMPUTER-READABLE RECORDING MEDIUM

(71) Applicant: FUJIFILM Corporation, Minato-ku, Tokyo (JP)

(72) Inventor: Satoshi Seto, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/288,549

(22) Filed: May 28, 2014

(65) Prior Publication Data

US 2014/0355011 A1 Dec. 4, 2014

(30) Foreign Application Priority Data

May 31, 2013 (JP) .................................. 2013-115863
Sep. 20, 2013 (JP) .................................. 2013-195156

(51) Int. Cl.
*G06F 15/00* (2006.01)
*G06K 1/00* (2006.01)
*G06K 15/02* (2006.01)
*G06F 3/12* (2006.01)

(52) U.S. Cl.
CPC .............. *G06F 3/125* (2013.01); *G06F 3/1204* (2013.01); *G06F 3/1208* (2013.01); *G06F 3/1256* (2013.01); *G06F 3/1282* (2013.01); *G06F 3/1258* (2013.01)

(58) Field of Classification Search
CPC ..... G06F 3/125; G06F 3/1204; G06F 3/1256; G06F 3/1282
USPC .......................... 358/1.1, 1.13, 1.2, 1.14, 1.15
See application file for complete search history.

(56) References Cited

U.S. PATENT DOCUMENTS 8,566,704 B1 * 10/2013 Le Bescond de Coatpont et al. .............................. 715/234
8,819,545 B2 * 8/2014 Nonaka ......................... 715/247

OTHER PUBLICATIONS

Neo User Manual, Jan. 1, 2008, retrieved from http://help.esko.com/docs/en-us/neo/10.1/userguide/pdf/Neo_RefMan.pdf, retrieved on Sep. 11, 2014, 195 pages.
Communication, dated Sep. 19, 2014, issued in corresponding EP Application No. 14169466.1, 7 pages in English.
PDF Reference 2nd Edition, Adobe Portable Document Format Version 1.3, Nov. 20, 2008 fifth printing of first edition ublished, Author; Adobe Systems, Publisher; Pearson Education company, ISBN4-89471-338-1, pp. 452-454.

* cited by examiner

*Primary Examiner* — Douglas Tran
(74) *Attorney, Agent, or Firm* — Sughrue Mion, PLLC

(57) ABSTRACT

There are provided an imposition apparatus, an imposition method, and a non-transitory computer readable recording medium capable of setting a page box very easily. An instruction to change the relative position (or the relative size) of a frame image with respect to a page image in a preview image and an instruction to stop the change are given. The preview image is updated so that the frame image is in contact with a determined reference position (reference frame or reference line) by performing an additional change when a stop instruction is received.

20 Claims, 12 Drawing Sheets

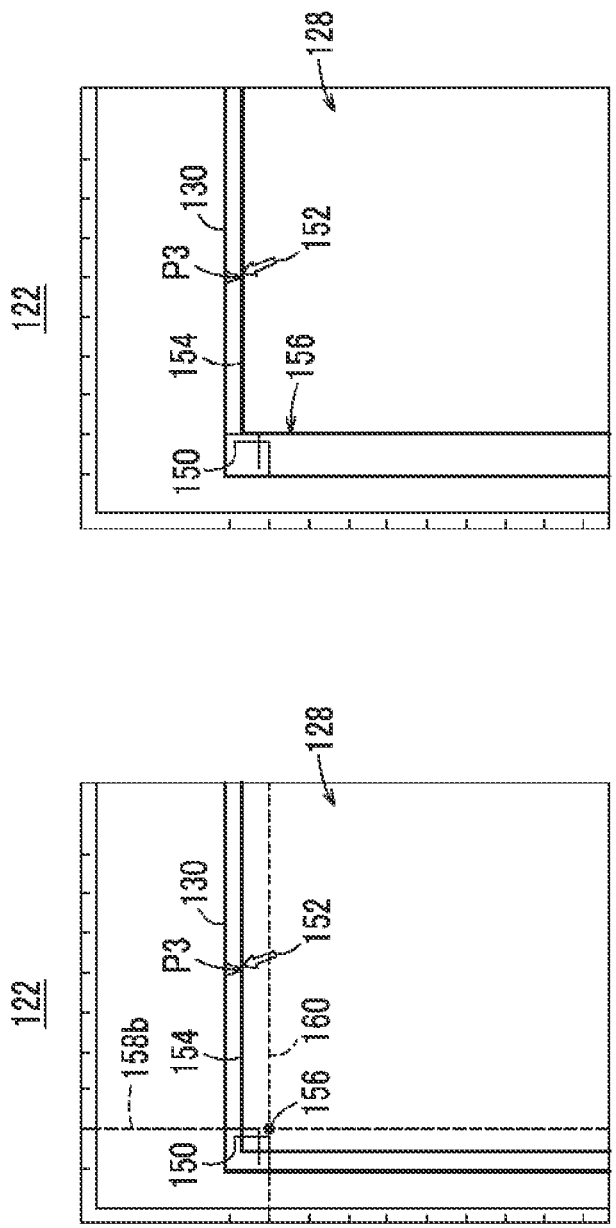

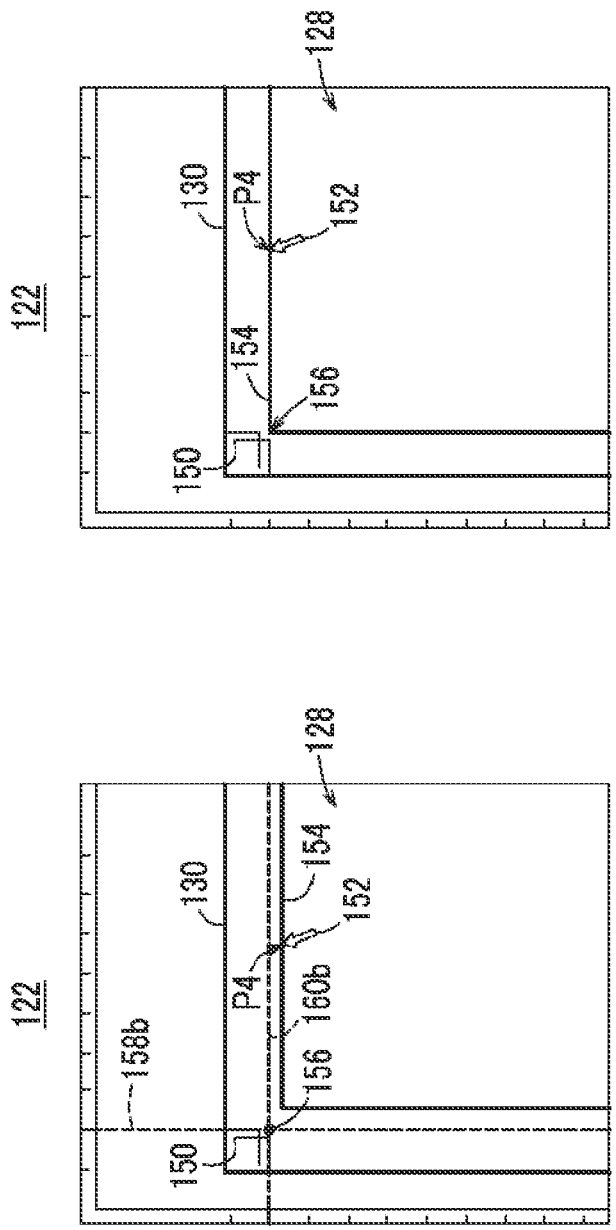

IMPOSITION APPARATUS, IMPOSITION METHOD, AND NON-TRANSITORY COMPUTER-READABLE RECORDING MEDIUM

CROSS-REFERENCE TO RELATED APPLICATIONS

The present application claims priority under 35 U.S.C. §119 to Japanese Patent Application No. 2013-115863, filed May 31, 2013 and Japanese Patent Application No. 2013-195156, filed Sep. 20, 2013, all of which are hereby expressly incorporated by reference into the present application.

BACKGROUND OF THE INVENTION

1. Field of the Invention

The present invention relates to an imposition apparatus, an imposition method, and a non-transitory computer readable recording medium to set a page box, which specifies the boundary of a page, for each page region.

2. Description of the Related Art

In recent years, in the field of printing and plate making, Computer To Plate (CTP) technology has become widespread to directly form a printing plate from electronic data without generating intermediate products. Therefore, cases in which a designer creates the content using an information processing terminal and then provides the content as electronic data to the printing company have increased. For example, in the portable document file (PDF) version 1.3 that is a kind of page description data, five kinds of "page box" as a parameter to define the boundary of a page are defined to support the prepress production workflow (refer to second edition of PDF reference, Adobe Portable Document Format Version 1.3, fifth impression of the first edition published Nov. 20, 2008, author; Adobe Systems, publishing office; Pearson Education, Co. ISBN4-89471-338-1, pages 452 to 454 and the like). An operator belonging to the printing company can use this "page box" when performing the electronic imposition work.

SUMMARY OF THE INVENTION

Incidentally, the page box is a type of independent parameter that is different from the content (form of drawing) disposed in a page region. Therefore, when an unknown designer submits a manuscript without setting the page box unintentionally, a setting value suitable for printing is not input if the page box cannot be set depending on the operating environment of the information processing terminal. In this case, the operator who has received the electronic data needs to modify the setting value of the page box each time. This has been a troublesome task. The present invention has been made to solve the aforementioned problem, and it is an object of the present invention to provide an imposition apparatus, an imposition method, and a non-transitory computer readable recording medium capable of setting the page box very easily.

According to an aspect of the present invention, there is provided an imposition apparatus that sets a page box for specifying a boundary of a page for each page region. The imposition apparatus includes: a reference position determination unit that determines a reference position, which is specified by at least one point or one line, in the page region; a display unit that displays a preview image by superimposing a frame image, which shows the boundary of the page on a page image disposed in the page region, on the page image; an image change instruction unit that gives an instruction to change a relative position of the frame image with respect to the page image in the preview image displayed by the display unit and an instruction to stop the change; and an image update unit that updates the preview image so that the frame image is in contact with the reference position determined by the reference position determination unit by performing an additional change when the stop instruction from the image change instruction unit is received.

According to another aspect of the present invention, there is provided an imposition apparatus that sets a page box for specifying a boundary of a page for each page region. The imposition apparatus includes: a reference position determination unit that determines a reference position, which is specified by at least one point or one line, in the page region; a display unit that displays a preview image by superimposing a frame image, which shows the boundary of the page on a page image disposed in the page region, on the page image; an image change instruction unit that gives an instruction to change a relative size of the frame image with respect to the page image in the preview image displayed by the display unit and an instruction to stop the change; and an image update unit that updates the preview image so that the frame image is in contact with the reference position determined by the reference position determination unit by performing an additional change when the stop instruction from the image change instruction unit is received.

Thus, the image change instruction unit, which gives an instruction to change the relative position (or the relative size) of the frame image with respect to the page image in the preview image and an instruction to stop the change, and the image update unit, which updates the preview image so that the frame image is in contact with the determined reference position by performing an additional change when a stop instruction is received, are provided. Therefore, since the frame image can be moved to the reference position without requiring the accuracy of the position according to the stop instruction, a page box can be set very easily.

It is preferable to further include a distance determination unit that determines whether or not a distance between a stop position of the frame image and the reference position is less than a threshold value. Preferably, the image update unit updates the preview image by further performing the additional change when the distance determination unit determines that the distance is less than the threshold value.

It is preferable to further include a distance determination unit that determines whether or not a distance between a current position of the frame image and the reference position is less than a threshold value. Preferably, the image update unit updates the preview image so as to change a display form according to a determination result of the distance determination unit.

Preferably, the image change instruction unit further gives an instruction regarding whether or not to allow the additional change, and the image update unit updates the preview image by performing the additional change only when an instruction to allow the additional change is given by the image change instruction unit.

Preferably, when a positioning mark is included in the page image, the reference position determination unit determines the reference position based on a position on the page image specified by the positioning mark.

Preferably, the image change instruction unit is formed by a touch sensor that detects a contact position or a proximity position on a display screen provided in the display unit.

It is preferable to further include a box position acquisition unit that acquires position information of the page box, which is specified in the preview image updated by the image update unit, so as to match the page region.

Preferably, the box position acquisition unit acquires the position information of the page box, which is specified in the preview image, so as to further match at least one page region that is not a display object of the preview image.

According to still another aspect of the present invention, there is provided an imposition method of setting a page box for specifying a boundary of a page for each page region using a computer. The imposition method includes: a step of determining a reference position, which is specified by at least one point or one line, in the page region; a step of displaying a preview image by superimposing a frame image, which shows the boundary of the page on a page image disposed in the page region, on the page image; a step of giving an instruction to change a relative position of the frame image with respect to the page image in the displayed preview image and an instruction to stop the change; and a step of updating the preview image so that the frame image is in contact with the determined reference position by performing an additional change when the stop instruction is received.

According to still another aspect of the present invention, there is provided an imposition method of setting a page box for specifying a boundary of a page for each page region using a computer. The imposition method includes: a step of determining a reference position, which is specified by at least one point or one line, in the page region; a step of displaying a preview image by superimposing a frame image, which shows the boundary of the page on a page image disposed in the page region, on the page image; a step of giving an instruction to change a relative size of the frame image with respect to the page image in the displayed preview image and an instruction to stop the change; and a step of updating the preview image so that the frame image is in contact with the determined reference position by performing an additional change when the stop instruction is received.

According to still another aspect of the present invention, there is provided a non-transitory computer readable recording medium for setting a page box for specifying a boundary of a page for each page region. The non-transitory computer readable recording medium causes a computer to execute: a step of determining a reference position, which is specified by at least one point or one line, in the page region; a step of displaying a preview image by superimposing a frame image, which shows the boundary of the page on a page image disposed in the page region, on the page image; a step of giving an instruction to change a relative position of the frame image with respect to the page image in the displayed preview image and an instruction to stop the change; and a step of updating the preview image so that the frame image is in contact with the determined reference position by performing an additional change when the stop instruction is received.

According to still another aspect of the present invention, there is provided a non-transitory computer readable recording medium for setting a page box for specifying a boundary of a page for each page region. The non-transitory computer readable recording medium causes a computer to execute: a step of determining a reference position, which is specified by at least one point or one line, in the page region; a step of displaying a preview image by superimposing a frame image, which shows the boundary of the page on a page image disposed in the page region, on the page image; a step of giving an instruction to change a relative size of the frame image with respect to the page image in the displayed preview image and an instruction to stop the change; and a step of updating the preview image so that the frame image is in contact with the determined reference position by performing an additional change when the stop instruction is received.

According to the imposition apparatus, the imposition method, and the non-transitory computer readable recording medium of the present invention, an instruction to change the relative position (or the relative size) of the frame image with respect to the page image in the preview image and an instruction to stop the change are given, and the preview image is updated so that the frame image is in contact with the determined reference position by performing an additional change when a stop instruction is received. Therefore, since the frame image can be moved to the reference position without requiring the accuracy of the position according to the stop instruction, a page box can be set very easily.

BRIEF DESCRIPTION OF THE DRAWINGS

FIGS. 8A and 8B are image diagrams showing a form change of a preview image.

FIGS. 9A and 9B are image diagrams showing a form change of a preview image.

DESCRIPTION OF THE PREFERRED EMBODIMENTS

Hereinafter, an imposition method according to the present invention will be described in detail by way of a preferred embodiment for the relationship with an imposition apparatus and a non-transitory computer readable recording medium to execute the imposition method while referring to the accompanying diagrams.

[Overall Configuration of a Print Production System 10]

Figure 1:
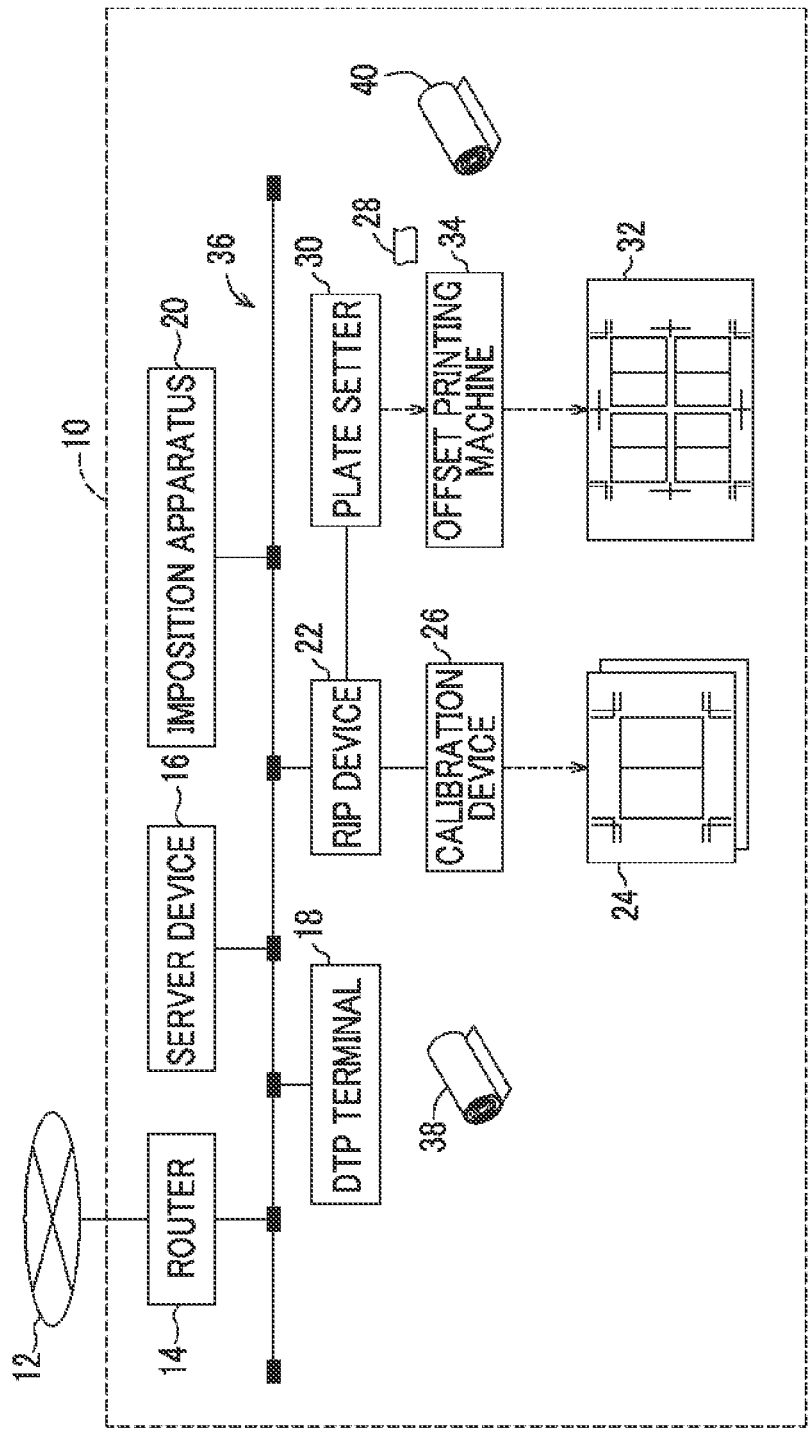
FIG. 1 is a diagram showing the overall configuration of a print production system in which an imposition apparatus according to the present embodiment is provided.

FIG. 1 is a diagram showing the overall configuration of the print production system 10 in which an imposition apparatus 20 according to the present embodiment is provided.

The print production system 10 includes a router 14 that is a device for relaying the connection with a network 12, a server device 16 that can be accessed through the network 12 from each terminal device (not shown) belonging to an external network, a DTP terminal 18 for performing a desktop publishing (DTP) process including the editing of data acquired from the server device 16 or the like, the imposition apparatus 20 that imposes the content data processed by the DTP terminal 18, a raster image processor (RIP) device 22 that performs various kinds of image processing, such as rasterization processing or color conversion processing, based on output data imposed by the imposition apparatus 20, a calibration device 26 that can print a proof 24 based on calibration data transmitted from the RIP device 22, a plate setter 30 that produces a printing plate 28 based on plate making data transmitted from the RIP device 22, and an offset printing machine 34 that can form a printed matter 32 by mounting the printing plate 28.

The server device 16 is a device that forms the core of the workflow management in the print production system 10. The server device 16 is communicably connected to each terminal device that a designer and/or a production company (both not shown) has through the router 14 and the network 12. The server device 16 is communicably connected to the DTP terminal 18, the imposition apparatus 20, and the RIP device 22 through a local area network (LAN) 36 built in the print production system 10.

That is, the server device 16 is configured to be able to execute a function as a file server that is responsible for the storage and transmission of various data files, a function as a rights management server that manages the task authorities that can be executed in each terminal device, each user, or each print job, or a function as a mail server that generates and distributes a notification e-mail at a predetermined timing, such as the start and end of each process.

Examples of various data files that can be managed as a file server include content data, print data (for example, plate making data, plate data, or calibration data), a job ticket (for example, a job definition format (JDF) file), an international color consortium (ICC) profile, and color sample data.

The DTP terminal 18 generates image data in units of a page after performing pre-flight processing on the content data including letters, a graphic, a picture, or a photo. The imposition apparatus 20 performs imposition processing according to the specified binding method or paper folding method with reference to the tag information of the job ticket.

The RIP device 22 functions as a print processing server for at least one type of printing machine. In the example shown in FIG. 1, the RIP device 22 is communicably connected to the calibration device 26 and the plate setter 30. In this case, the RIP device 22 converts data of the PDL format described in page description language (hereinafter, referred to as page description data) into output data suitable for each output device, and supplies the output data to the calibration device 26 or the plate setter 30.

The calibration device 26 outputs the proof 24, in which an image is formed on calibration paper 38 (print medium), based on the calibration data supplied from the RIP device 22. Direct digital color proofing (DDCP), a color ink jet proofer, a low-resolution color laser printer (electrophotographic type), an ink jet printer, or the like may be used as the calibration device 26.

The offset printing machine 34 outputs the printed matter 32, in which an image is formed on printing paper 40 (print medium), by depositing ink on one side or both sides of the printing paper 40 through the printing plate 28 and an intermediate transfer member (not shown). Instead of the offset printing machine 34, a digital printing machine for direct printing may be provided. As a digital printing machine, an ink jet printer, a wide format printer, a color ink jet proofer, a color laser printer, and the like may be used.

[Electric Block Diagram of the Imposition Apparatus 20]

Figure 2:
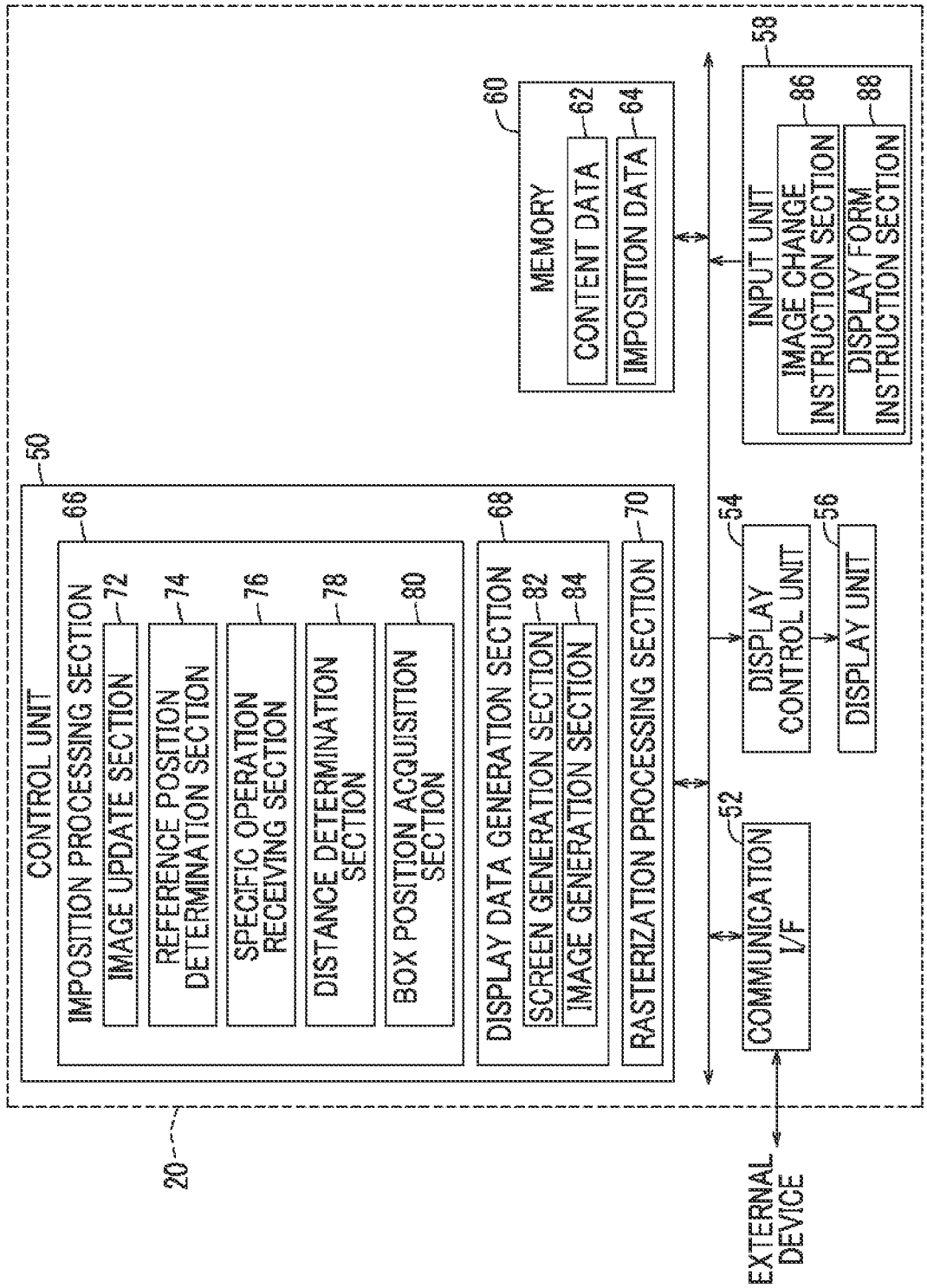
FIG. 2 is an electric block diagram of the imposition apparatus shown in FIG. 1.

FIG. 2 is an electric block diagram of the imposition apparatus 20 shown in FIG. 1. Basically, the imposition apparatus 20 is a computer including a control unit 50, a communication I/F 52, a display control unit 54, a display unit 56, an input unit 58, and a memory 60 (storage medium).

The communication I/F 52 is an interface (I/F) to transmit and receive an electric signal from an external device. Accordingly, the imposition apparatus 20 can acquire various kinds of data (for example, content data 62) from the server device 16 (FIG. 1), and can supply various kinds of data (for example, imposition data 64) to the server device 16.

Figure 5:
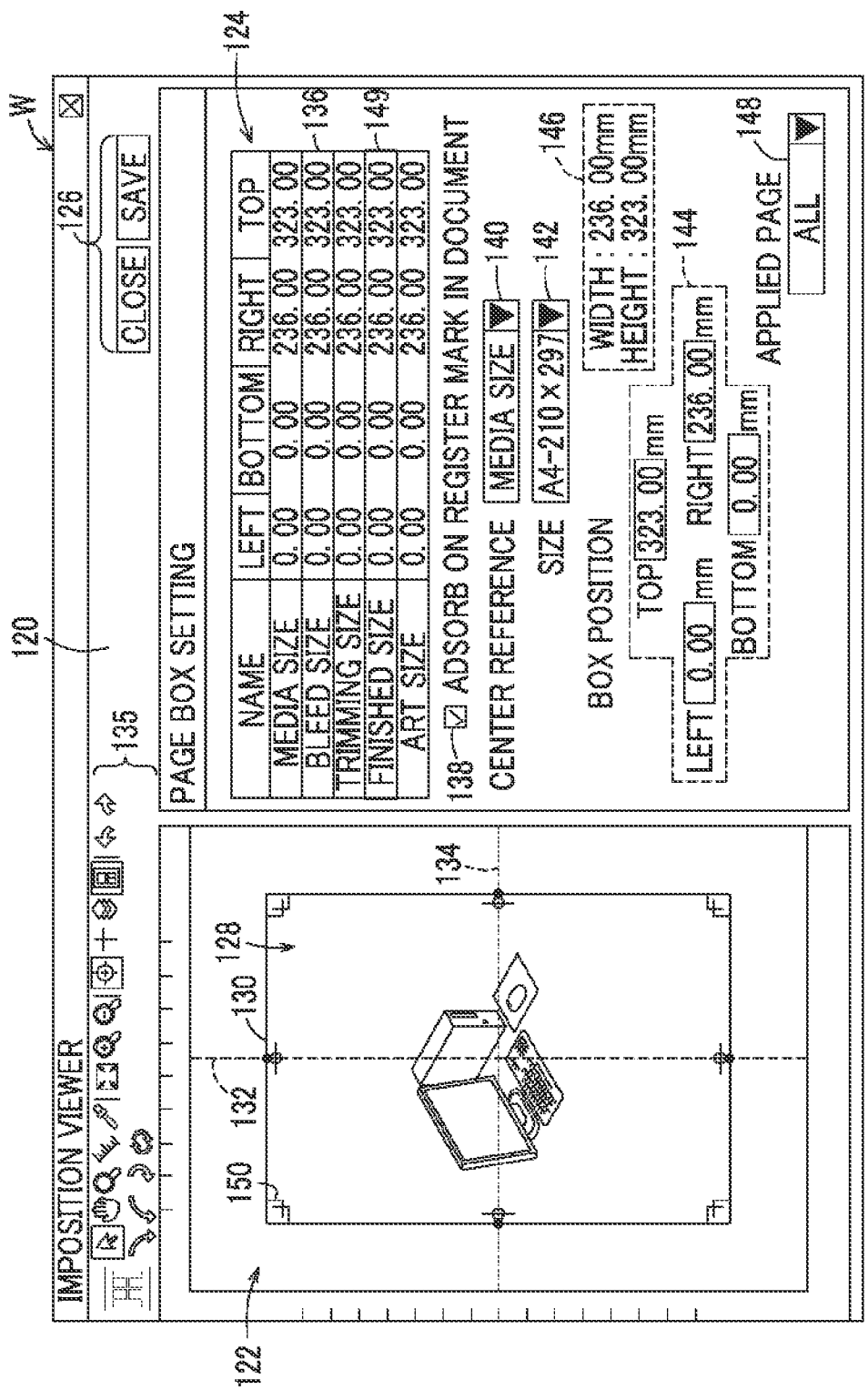
FIG. 5 is a first image diagram showing the setting screen of a page box.

The display control unit 54 is a control circuit that controls the driving of the display unit 56 according to the control of the control unit 50. The display control unit 54 outputs a display control signal to the display unit 56 through an I/F (not shown) to drive the display unit 56. Therefore, the display unit 56 can display various images including a window W (FIG. 5 and the like).

The memory 60 stores a program, data, and the like required for the control unit 50 to control each component. In this example shown in FIG. 2, the content data 62 in a PDF format and the imposition data 64 in a JDF format are stored.

The memory 60 is non-transitory, and may be a computer-readable storage medium. Examples of the computer-readable storage medium include portable media, such as a magneto-optical disc, a ROM, a CD-ROM, and a flash memory, and a storage device, such as a hard disk built in a computer system. The storage medium may be a medium that stores a program dynamically in a short time, or may be a medium that stores a program for a fixed period of time.

The control unit 50 is formed by a processor, such as a central processing unit (CPU). The control unit 50 can realize each function of an imposition processing section 66, a display data generation section 68, and a rasterization processing section 70 by reading and executing a program stored in the memory 60.

The imposition processing section 66 generates the imposition data 64 including the setting value of a page box, which will be described later, based on the content data 62 acquired in advance. Specifically, the imposition processing section 66 includes an image update section 72 that sequentially updates a preview image 122 (FIG. 5), a reference position determination section 74 that determines a reference position in a page region 100 (FIG. 4A), a specific operation receiving section 76 that receives a series of operations for the stopping and relative displacement of a frame image 154 (FIG. 6B and the like), a distance determination section 78 that calculates and determines a distance between the reference position and the position of the frame image 154, and a box position acquisition section 80 that acquires the setting value of a page box according to the position of the frame image 154.

The display data generation section 68 includes a screen generation section 82 that generates a setting screen 120 (FIG. 5 and the like) and an image generation section 84 that generates the preview image 122 (FIG. 5 and the like).

The rasterization processing section 70 executes rasterization processing on the page description data after imposition processing. Data format conversion processing for conversion from the PDL format to the raster format and color matching processing using an ICC profile are included in the rasterization processing.

The input unit 58 is configured to include various input devices, such as a mouse, a track ball, a keyboard, and a touch sensor. A user interface is realized by combining the display function of the display unit 56 and the input function of the input unit 58. In this case, the input unit 58 functions as an image change instruction section 86, which instructs the change and stop of the relative position and size of the frame image 154 (FIG. 6B and the like) or gives an instruction on whether or not to allow an additional change (to be described in detail later), and a display form instruction section 88 that gives an instruction on the display form of the preview image 122.

[Operation of the Imposition Apparatus 20]

The imposition apparatus 20 according to the present embodiment is configured as described above. Next, the operation of the imposition apparatus 20 shown in FIGS. 1 and 2 will be described in detail with reference mainly to the flowchart shown in FIG. 3. First, terms (a page box and an adsorption process) required for the understanding of the present invention will be defined.

In order to support the prepress production workflow, the PDF is configured to be able to set the page box. The "page box" is a parameter that defines the boundary of the page, and five kinds of parameters of MediaBox, BleedBox, CropBox, TrimBox, and ArtBox are prepared.

The "MediaBox" (media size) defines a maximum printable region of a physical medium on which a page is to be printed. The "BleedBox" (bleed size) defines a region where the content of a page is clipped at the time of output in a production environment. The "CropBox" (trimming size) defines a region that is clipped when the content of a page is output. The "TrimBox" (finished size) defines a size intended in the finished page after trimming. The "ArtBox" (art size) defines the range of the meaningful content in a page that the author intends.

A designer who is a creator of the content data 62 inputs each value of the "page box" suitable for the layout of an image in advance when submitting electronic data. For example, if this input is not performed, the default value is usually set. Therefore, the operator needs to check whether or not the correct value is set in the page box and to modify the setting value when necessary.

In the present embodiment, therefore, there is provided a graphical user interface through which the position of a virtual frame can be adjusted according to the operation of the operator as a user under the conditions in which a page and the form of the page box are visibly displayed. In particular, the imposition apparatus 20 has a function of the adsorption process in order to support the adjustment operation of the user. Here, the "adsorption process" is a process for automatically changing the frame image 154 so as to be in contact with the reference position (for example, a register mark) on a page image 128 in the preview image 122 (FIG. 5).

Figure 3:
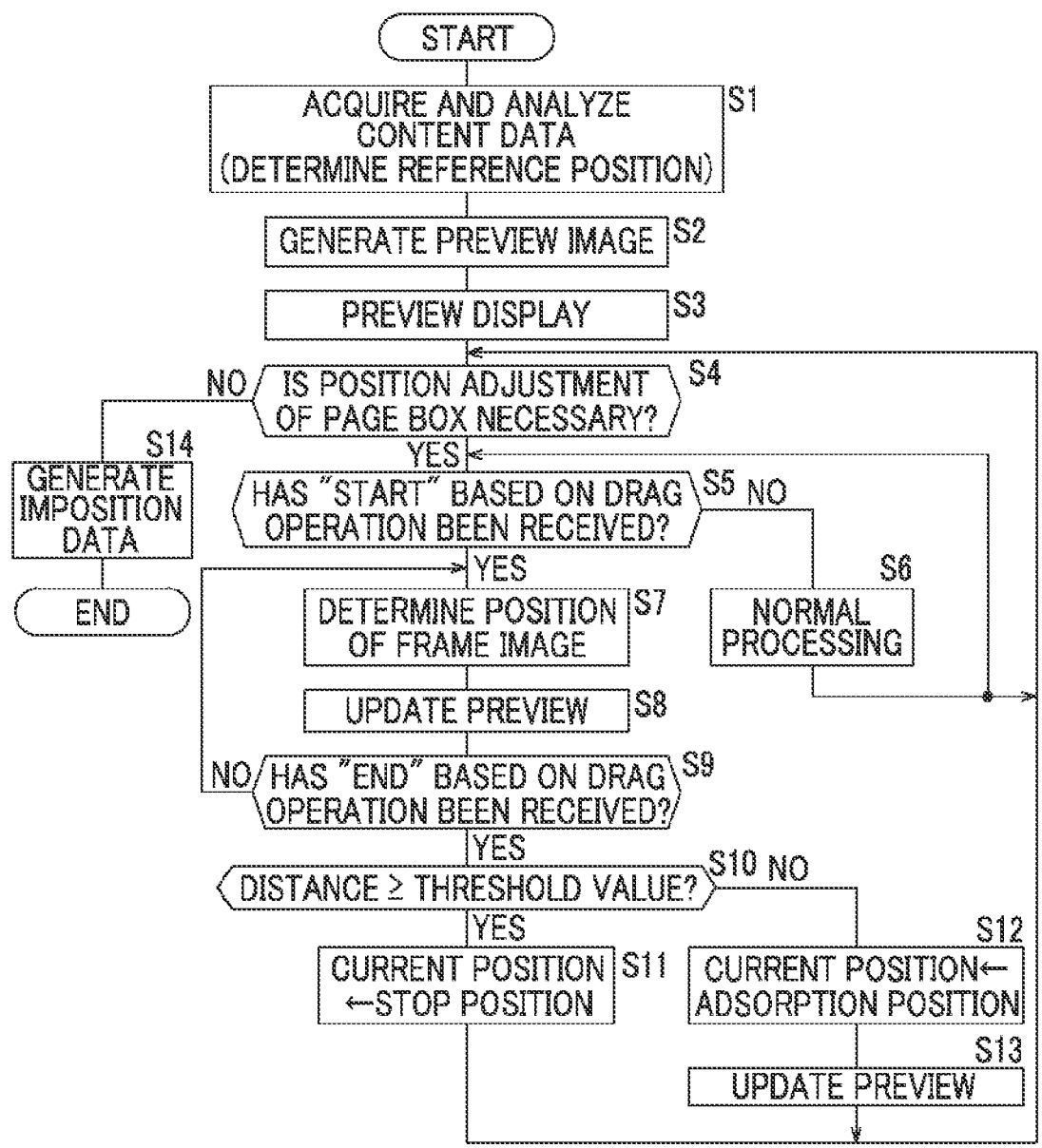
FIG. 3 is a flowchart presented to explain the operation of the imposition apparatus shown in FIGS. 1 and 2.

In step S1 of FIG. 3, the imposition processing section 66 acquires the content data 62, which is an object to be imposed, by reading the content data 62 from the memory 60 or the like, and analyzes the content of the content data 62.

Figure 4:
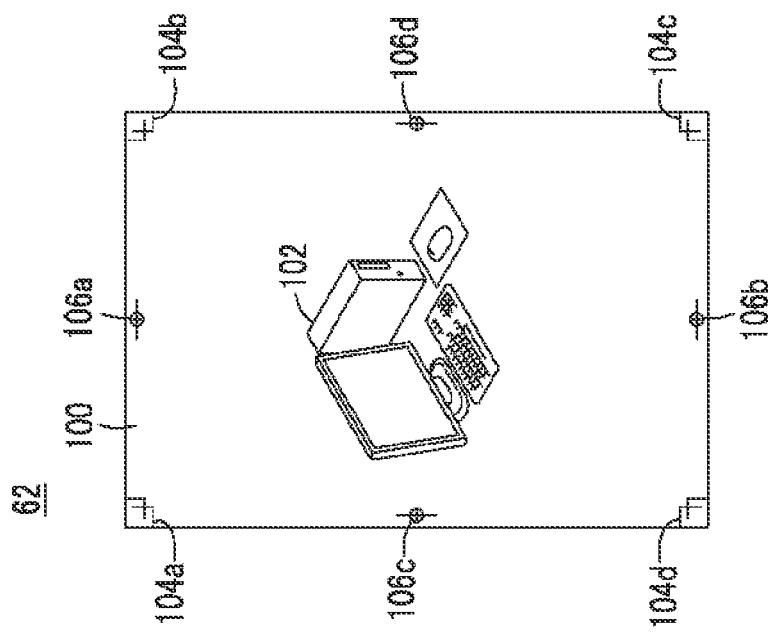
FIG. 4A is a schematic front view to visualize a page region indicated by content data.
FIG. 4B is an explanatory diagram showing a determination result of the reference position for the page region shown in FIG. 4A.

FIG. 4A is a schematic front view to visualize the page region 100 indicated by the content data 62. A content image 102 showing the perspective view of an electronic apparatus, four corner register marks 104a to 104d, and four central register marks 106a to 106d are disposed in the rectangular page region 100.

During the analysis process, the reference position determination section 74 determines a position of the reference specified by at least one point or one line (hereinafter, simply referred to as a "reference position") in the page region 100. For example, the reference position determination section 74 detects automatically a positioning mark (so-called register mark) present in the page region 100, and determines a reference position based on the detection result. As a positioning mark detection method, a known detection process based on the color and/or the shape of an image can be applied. For example, a part including a specific color (of which dot percentage is 100%) and a part including edge strength or a linear component along a specific direction may be extracted as positioning marks.

FIG. 4B is an explanatory diagram showing a determination result of the reference position for the page region 100 shown in FIG. 4A. Reference frames 110 and 112 and reference lines 114 and 116 are present in a page outer frame 108 that is a boundary of the entire page region 100. The reference frame 110 is a rectangular frame obtained by connecting one point (intersection of two L-shaped marks) indicated by each of the double corner register marks 104a to 104d. The reference frame 112 is a rectangular frame obtained by connecting the other points (apex of the circumscribed rectangle and the apex angle side of the L letter) indicated by the double corner register marks 104a to 104d. The reference line 114 is a straight line extending in a vertical direction that connects the center-of-gravity positions of the central register marks 106a and 106b. The reference line 116 is a straight line extending in a horizontal direction that connects the center-of-gravity positions of the central register marks 106c and 106d.

In addition, it is needless to say that the determination process is not limited to the automatic determination method described above and, for example, a method of determining the reference position by the manual operation of the operator can be adopted.

In step S2, the image generation section 84 generates the preview image 122 (refer to FIG. 5 and the like) based on the content data 62 acquired in step S1. A specific form of the preview image 122 will be described later.

In step S3, the imposition apparatus 20 displays the setting screen 120 to be used to set the page box. In response to an instruction to start the setting, the screen generation section 82 generates display data of the setting screen 120 (including the preview image 122) and then supplies the display data to the display control unit 54. Then, the display control unit 54 displays a window W (including the setting screen 120) on the display unit 56.

As shown in FIG. 5, the preview image 122, a setting field 124, and a button group 126 written as [Close] and [Save] are disposed on the setting screen 120. The operator can perform various settings through the preview image 122 or the setting field 124 while operating the input unit 58 (FIG. 2).

The preview image 122 is an image obtained by superimposing a frame image 130, which shows the position of a page box on the page image 128, on the page image 128 disposed in the page region 100 (FIG. 4A). The frame image 130 is displayed at a position corresponding to each setting value in a different display form for each type of page box. In this example shown in FIG. 5, since all setting values of the page box are the same, substantially one frame image 130 is displayed. On the preview image 122, a centerline 132 along the vertical direction and a centerline 134 along the horizontal direction are further displayed so as to overlap the preview image 122. The two centerlines 132 and 134 shown by dotted lines cross each other at the center of the frame image 130.

An icon group 135 including a plurality of tool icons is disposed above the preview image 122. The icon group 135 functions as the display form instruction section 88 (FIG. 2) that gives an instruction on the display form of the preview image 122. That is, according to the operation using the icon group 135, various display forms including the rotation, movement, reversal, or enlargement and reduction of the preview image 122 can be realized.

A list 136 of a page box, a check box 138, two pull-down menus 140 and 142, one text box group 144, one column 146, and a pull-down menu 148 are disposed in the setting field 124.

In the list 136, items of the "name" of the page box, "left" corresponding to the minimum value of the horizontal direction (X-axis) coordinate, "bottom" corresponding to the minimum value of the vertical direction (Y-axis) coordinate, "right" corresponding to the maximum value of the horizontal direction (X-axis) coordinate, and "top" corresponding to the maximum value of the vertical direction (Y-axis) coordinate are written from left to right. For example, by making the display color of the frame image 130 and the list 136 uniform for each type of page box, the operator can grasp the current position and the setting value of the page box at a glance.

The check box 138 is a control for setting whether or not to allow the execution of the adsorption process. For example, the check box 138 is displayed as "active" when the reference position can be determined from the positioning mark present in the page region 100 (refer to FIG. 4A). In addition, the following is set. The execution of the adsorption process is allowed when this check is "ON", and the execution of the adsorption process is not allowed when this check is "OFF".

The pull-down menu 140 is a control for setting alternatively the type of page box as a reference of the centerlines 132 and 134. The pull-down menu 142 is a control for setting the size of the media box.

The text box group 144 is a control for setting the position of the page box. The operator can perform the text input of each value (unit: mm) of "left", "bottom", "right", and "top", which are defined in the same manner as the list 136, through the text box group 144. In addition, the input value of the text box group 144 is linked to the position of the frame image 130, so that the other side is changed so as to follow the change of the one side.

The width and height (unit: mm) of the page box are displayed in the column 146. That is, the display value (236.00) of the width is calculated by "right (236.00)"-"left (0.00)", and the display value (323.00) of the height is calculated by "top (323.00)"-"bottom (0.00)".

In addition, a selection frame 149 is given to one of the five rows of the list 136. A setting of the type surrounded by the selection frame 149, that is, a setting of the "finished size" is effective. That is, the current setting value of the "finished size" is displayed in the text box group 144 and the column 146. In addition, positions of the centerlines 132 and 134 are determined based on the setting value.

In step S4, the operator determines whether or not it is necessary to adjust the position of the page box while viewing the preview image 122 in FIG. 5. In the example shown in FIG. 5, since the setting value of the page box is not an appropriate setting value, it is determined that position adjustment is required (step S4: YES), and the process proceeds to the next step (S5).

In step S5, the specific operation receiving section 76 determines whether or not "start" by the drag operation using the input unit 58 has been received. When it is determined that the "start" by the drag operation has not been received yet, normal processing operations are performed (step S6), and then the process returns to step S4 (or step S5). On the other hand, when it is determined that the "start" by the drag operation has been received, the process proceeds to step S7.

Figure 6B:
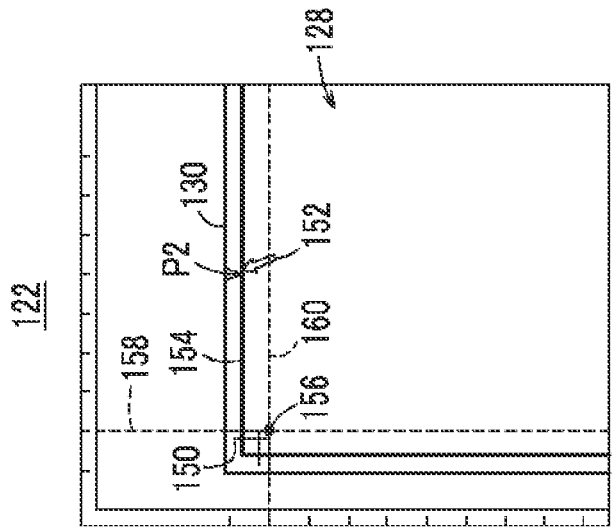
FIGS. 6A and 6B are image diagrams showing a form change of a preview image.
Figure 6A:
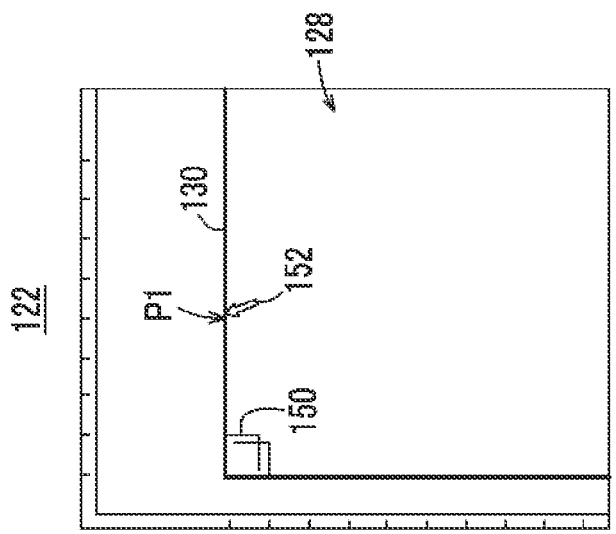

As shown in FIG. 6A, when there is a click operation under the conditions in which a cursor 152 matches an arbitrary position (in this diagram, a position P1) on the frame image 130, it is determined that "start" has been received. Here, one type (finished size) surrounded by the selection frame 149 is selected among the five types of page boxes, and the movement of this position is performed. Hereinafter, a frame image to be moved will be referred to as a "frame image 154" in order to distinguish it from another frame image 130.

Then, steps S7 and S8 are sequentially repeated until it is determined that "end" by the drag operation has been received in step S9 to be described later.

In step S7, the distance determination section 78 determines the position of the frame image 154 selected in step S5. Specifically, the distance determination section 78 calculates a distance between the frame image 154 and the reference frame 112 after acquiring the current position of the frame image 154.

In step S8, the imposition apparatus 20 updates the preview image 122 according to the behavior of a drag operation. The image update section 72 acquires the amount of movement of the frame image 154 from the image change instruction section 86, and gives an instruction to update the preview image 122 by supplying the amount of movement to the image generation section 84. Then, the image generation section 84 newly generates the preview image 122, which shows a form in which at least one of the page image 128 and the frame image 154 has been moved, based on the supplied amount of movement. In this manner, the imposition apparatus 20 displays the frame image 154 that follows a change in the current position of the frame image 154.

By performing a drag operation of moving the tip of the cursor 152 from the position P1 to a position P2, the state of the preview image 122 shown in FIG. 6A is changed to the state of the preview image 122 shown in FIG. 6B.

As shown in FIG. 6B, a change (in the lower right direction) in the relative position of the frame image 154 with respect to the page image 128 in the preview image 122 is performed so as to follow the movement of the cursor 152. In addition, two auxiliary lines 158 and 160 passing through an intersection 156 are displayed together while continuing the drag operation. The intersection 156 corresponds to the upper left side apex of the reference frame 112 (FIG. 4B).

For example, the display form of the auxiliary line 158 or 160 may be changed according to the positional relationship (specifically, a distance) between the frame image 154 and the reference frame 112. Hereinafter, the distance calculation method in step S7 will be described in detail with reference to FIGS. 7A to 7D.

FIGS. 7A to 7D are explanatory diagrams schematically showing the positional relationship between the frame image 154 and the reference frame 112. Here, the horizontal direction of the preview image 122 is defined as an X axis, and the vertical direction of the preview image 122 is defined as a Y axis.

As shown in common in FIGS. 7A to 7D, a side 162 along the Y axis and a side 164 along the X axis are shown as a part (upper left corner) of the frame image 154. Similarly, a side 166 along the Y axis and a side 168 along the X axis are shown as a part of the reference frame 112.

Here, the distance between the frame image 154 and the reference frame 112 is defined separately for X and Y components. That is, the distance between the sides 162 and 166 is assumed to be an X component, and the distance between the sides 164 and 168 is assumed to be a Y component. The distance determination section 78 determines that "adsorption is not possible" when the X component (or the Y component) is equal to or greater than a threshold value Th, and determines that "adsorption is possible" when the X component (or the Y component) is less than the threshold value Th.

Figure 7A:
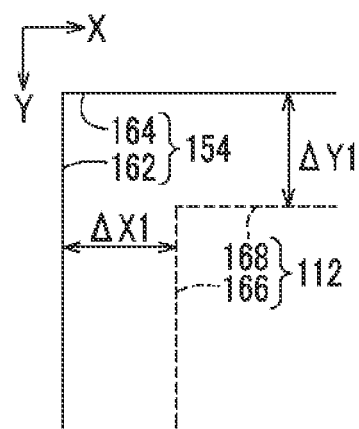
FIGS. 7A to 7D are explanatory diagrams schematically showing the positional relationship between a reference frame and a frame image.
Figure 7B:
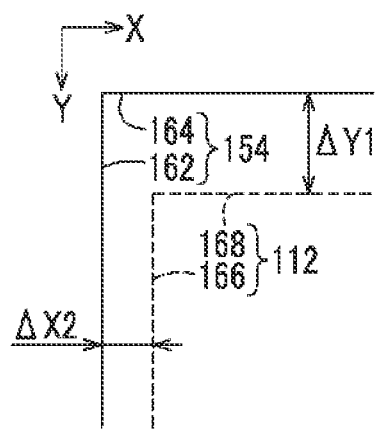
Figure 7C:
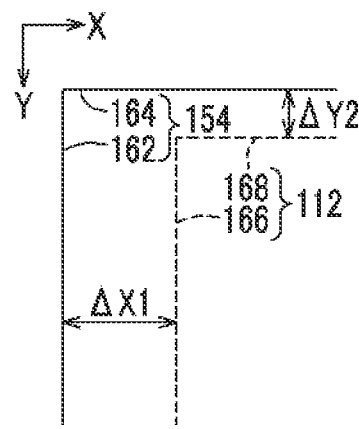

In FIG. 7A, it is assumed that the X component of the distance is $\Delta X1$ and the Y component of the distance is $\Delta Y1$. In FIG. 7B, it is assumed that the X component of the distance is $\Delta X2$ ($<\Delta X1$) and the Y component of the distance is $\Delta Y1$. In FIG. 7C, it is assumed that the X component of the distance is $\Delta X1$ and the Y component of the distance is $\Delta Y2$ ($<\Delta Y1$).

Figure 7D:
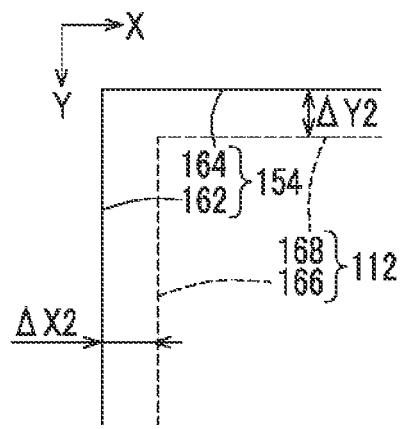

In FIG. 7D, it is assumed that the X component of the distance is ΔX2 and the Y component of the distance is ΔY2. For example, a case is assumed in which the threshold value is Th and the relationship of ΔX2<Th<ΔX1 and ΔY2<Th<ΔY1 is satisfied.

Referring back to FIG. 6B, when the positional relationship in FIG. 6B corresponds to FIG. 7A, both the auxiliary lines 158 and 160 are expressed by the dotted line having a normal line width. This shows a state of "adsorption is not possible" for both the X and Y axes.

By performing a drag operation of moving the tip of the cursor 152 from the position P2 to a position P3, the state of the preview image 122 shown in FIG. 6B is changed to the state of the preview image 122 shown in FIG. 8A.

When the positional relationship shown in FIG. 8A corresponds to FIG. 7C, an auxiliary line 158b is expressed by the dotted line having a larger line width than the normal line width. This highlighted display form shows a state of "adsorption is possible" for the X axis. On the other hand, in the same manner as in FIG. 6B, the auxiliary line 160 is expressed by the dotted line having a normal line width (corresponding to "adsorption is not possible").

Thus, the image update section 72 updates the preview image 122 so that the display form is changed according to the determination result of the distance determination section 78. As the display form, not only the line width described above but also changes in other shape features, color changes, and granting of visual effects (for example, blinking, swinging display, and the like) may be included, and there is no limitation on the means as long as a relative visible difference can be provided for both images.

In step S9, the specific operation receiving section 76 determines whether or not "end" by the drag operation using the input unit 58 has been received. Specifically, the specific operation receiving section 76 determines whether or not the click operation, which has been maintained, has been canceled. When it is determined that the "end" by the drag operation has not been received yet, the process returns to step S7 and then steps S7 and S8 are sequentially performed. On the other hand, when it is determined that the "end" by the drag operation has been received, the process proceeds to the next step (S10).

In step S10, the distance determination section 78 determines the position of the frame image 154 that has stopped in step S9. The distance determination section 78 acquires the current position of the frame image 154 as a temporary stop position. Then, the distance determination section 78 determines the magnitude relationship with the threshold value Th after calculating the distance (ΔX and ΔY) from the reference frame 112. Since this determination method is the same as the processing of step S7, explanation thereof will be omitted.

When it is determined that the distance (ΔX and ΔY) is equal to or greater than the threshold value Th (step S10: YES), the image update section 72 updates the stop position acquired in step S10 as a current position (step S11).

On the other hand, when it is determined that the distance (ΔX and ΔY) is less than the threshold value Th (step S10: NO), the image update section 72 performs additional movement from the stop position acquired in step S10 so that the frame image 154 (a part of the frame image 154) is brought into contact with the reference frame 112. In the example shown in FIG. 8A, the relationship of ΔX (=ΔX2)<Th and ΔY (=ΔY1)>Th is satisfied. Therefore, the image update section 72 updates an adsorption position, which is located on the right side of the temporary stop position and is present on the reference frame 112, as a current position (step S12).

In step S13, the imposition apparatus 20 updates the preview image 122 according to the additional movement performed in step S12.

As shown in FIG. 8B, even though the cursor 152 indicates the position P3 as it is in the frame image 154, the relative movement (in the right direction) of the frame image 154 with respect to the page image 128 in the preview image 122 is performed. As can be understood from FIGS. 8A and 8B, the two auxiliary lines 158b and 160 are not displayed after a drop operation is performed. By performing such display, the effect as if the frame image 154 moves spontaneously and is adsorbed to the corner register mark 150 is made.

After step S11 or step S13 is performed, the process returns to step S4, and the position of the page box is adjusted in steps S4 to S13.

For example, by performing a drag operation of moving the tip of the cursor 152 from the position P3 to a position P4, the state of the preview image 122 shown in FIG. 8A is changed to the state of the preview image 122 shown in FIG. 9A.

When the positional relationship shown in FIG. 9A corresponds to FIG. 7D, both the auxiliary lines 158b and 160b are expressed by the dotted line having a larger line width than the normal line width. This highlighted display form shows a state of "adsorption is possible" for both the X and Y axes. Then, the state of the preview image 122 shown in FIG. 9A is changed to the state of the preview image 122 shown in FIG. 9B by performing a drop operation.

As shown in FIG. 9B, even though the cursor 152 indicates the position P4 as it is, the relative movement (in the upper left direction) of the frame image 154 with respect to the page image 128 in the preview image 122 is performed. As can be understood from FIGS. 9A and 9B, the two auxiliary lines 158b and 160b are not displayed after a drop operation is performed.

Figure 10A:
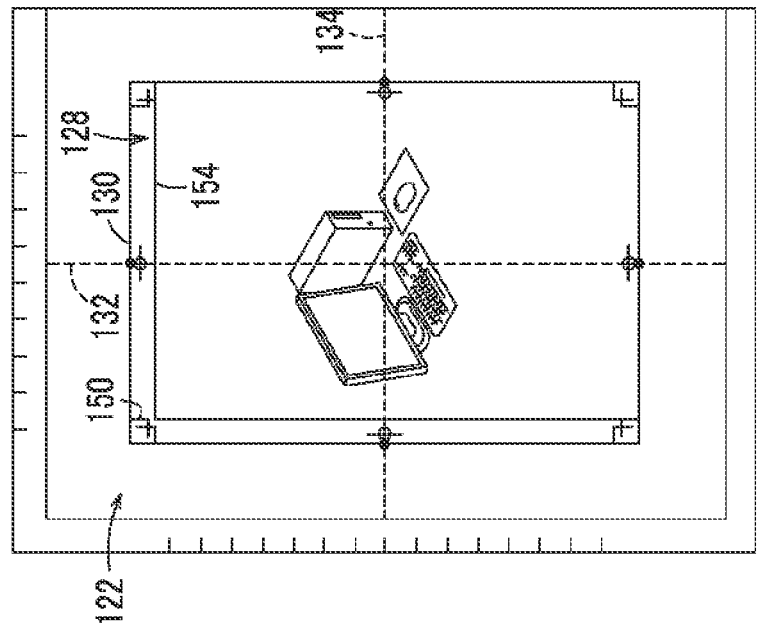
FIGS. 10A and 10B are schematic front views of a preview image.

As a result, as shown in FIG. 10A, the frame image 154 is moved in the lower right direction in a state where the position of the page image 128 is fixed. As can be understood from FIG. 10A, the position of the upper left corner ("left" and "top" of the page box) of the frame image 154 is appropriately adjusted. However, there is a problem in that the position of the lower right corner ("right" and "bottom" of the page box) of the frame image 154 is shifted due to the relative movement.

Therefore, the relative size of the frame image 154 with respect to the page image 128 in the preview image 122 may be changed so as to follow the movement of the cursor 152. In this case, the imposition apparatus 20 updates the preview image 122 according to a specific operation including a drag operation (step S8 in FIG. 3). The image update section 72 acquires the amount of size change in the frame image 154 from the image change instruction section 86, and gives an instruction to update the preview image 122 by supplying the amount of change to the image generation section 84.

Then, the image generation section 84 newly generates the preview image 122, which shows a form in which the size of at least one of the page image 128 and the frame image 154 has been changed, based on the supplied amount of change. In this manner, the imposition apparatus 20 displays the frame image 154 that follows a change in the current size of the frame image 154.

Figure 10B:
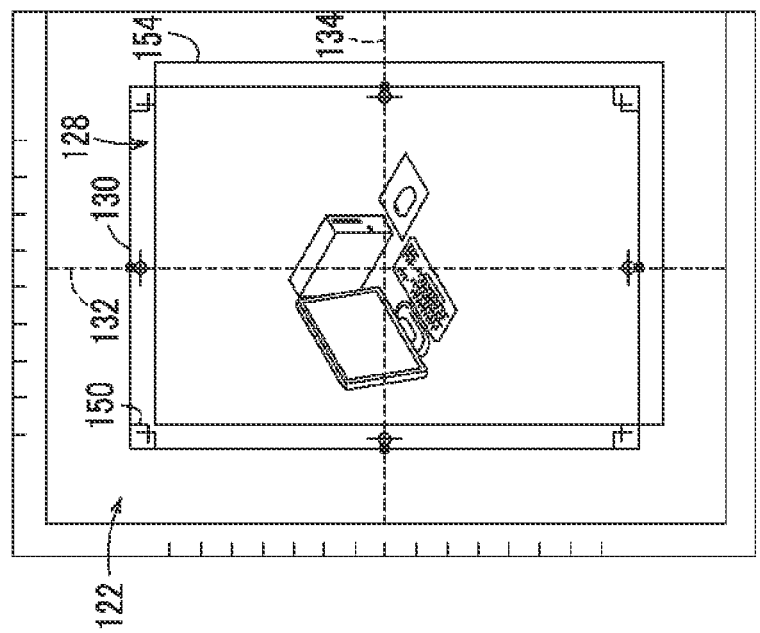

As a result, as shown in FIG. 10B, the size of the frame image 154 is changed (in the example shown in FIG. 10B, "reduced") by expanding or contracting and moving a part of the frame image 154 in a state where the size of the page image 128 is fixed. As can be understood from FIG. 10B, the position of the upper left corner of the frame image 154 is appropriately adjusted. Also by this size change, the position of the lower right corner of the frame image 154 is maintained without being shifted. In addition, it is needless to say that the function (refer to FIGS. 6A to 9B) of the "adsorption process" described above can be applied as it is even when changing the size without being limited to the position of the frame image 154.

Thus, the operator adjusts the position of the page box by appropriately changing the relative position and/or the size of the frame image 154 while viewing the preview image 122.

Returning to step S4 of FIG. 3, when it is determined that the position adjustment of the page box is not necessary (step S4: NO), the process proceeds to step S14.

Figure 11:
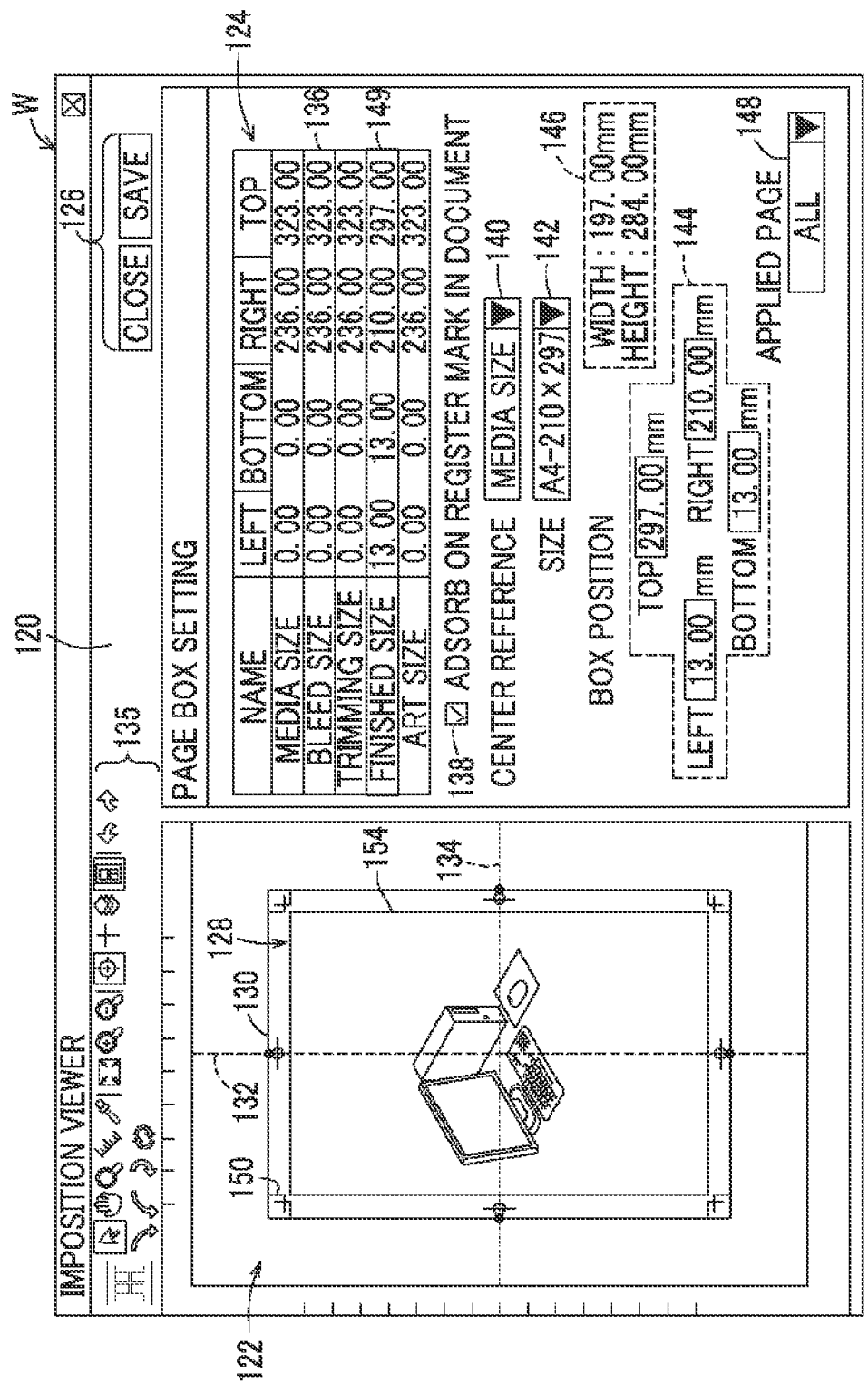
FIG. 11 is a second image diagram showing the setting screen of a page box.

FIG. 11 is a second image diagram showing the setting screen 120 of a page box. The setting screen 120 is different from the screen shown in FIG. 5 in that the position of the frame image 154 is adjusted. As a result of the position adjustment of the frame image 154, each value written in the list 136 (especially, the value in the selection frame 149), the text box group 144, and the column 146 is changed.

In addition, the pull-down menu 148 is a control for selecting in which page region (including the page region 100) the current value is to be set. For example, one of "all", "odd", "even", and "specify range" (including only a corresponding page) can be selected.

In step S14, the imposition processing section 66 generates the imposition data 64 by updating the setting value of the page box. Prior to generating the imposition data 64, the box position acquisition section 80 acquires the position information of the page box set on the setting screen 120 so as to match the page region 100. For example, when a plurality of page regions are present, the position information of the page box may be acquired so as to further match at least one page region that is not a display object of the preview image 122.

The imposition processing section 66 generates the imposition data 64 including the position information acquired by the box position acquisition section 80, and stores the imposition data 64 in the memory 60. Thereafter, in order to store the imposition data 64 in the server device 16, the imposition apparatus 20 may transmit the imposition data 64 to the outside through the communication I/F 52.

[Effect of the Present Embodiment]

As described above, the imposition apparatus 20 sets a page box for specifying the boundary of a page for each page region 100. In addition, the imposition apparatus 20 includes: the reference position determination section 74 that determines a reference position (reference frame 110 or 112 or reference line 114 or 116), which is specified by at least one point or one line, in the page region 100; the display unit 56 that displays the preview image 122 by superimposing the frame images 130 and 154, which show the boundary of the page on the page image 128, on the page image 128 disposed in the page region 100; the image change instruction section 86 that gives an instruction to change the relative position of the frame image 130 and/or 154 with respect to the page image 128 in the preview image 122 and an instruction to stop the change; and the image update section 72 that updates the preview image 122 so that the frame image 130 and/or 154 is in contact with the reference position by performing an additional change when a stop instruction is received.

Alternatively, the image change instruction section 86 gives an instruction to change the relative size of the frame image 130 and/or 154 with respect to the page image 128 in the preview image 122 and an instruction to stop the change.

Thus, an instruction to change the relative position (or the relative size) of the frame image 130 and/or 154 with respect to the page image 128 in the preview image 122 and an instruction to stop the change are given, and the preview image 122 is updated so that the frame images 130 and 154 are in contact with the determined reference position by performing an additional change when a stop instruction is received. Therefore, since the frame image 154 can be moved to the reference position without requiring the accuracy of the position according to the stop instruction, a page box can be set very easily.

[Modifications of the Present Embodiment]

Next, a modification of the present embodiment will be described with reference to FIG. 12. This modification is different from the present embodiment in that a touch sensor is applied as the input unit 58 instead of the cursor 152 (FIG. 6A and the like). The touch sensor detects a contact position or a proximity position on the display screen provided in the display unit 56. As a detection method, various methods including a capacitive method and a resistance film method may be adopted.

Figure 12:
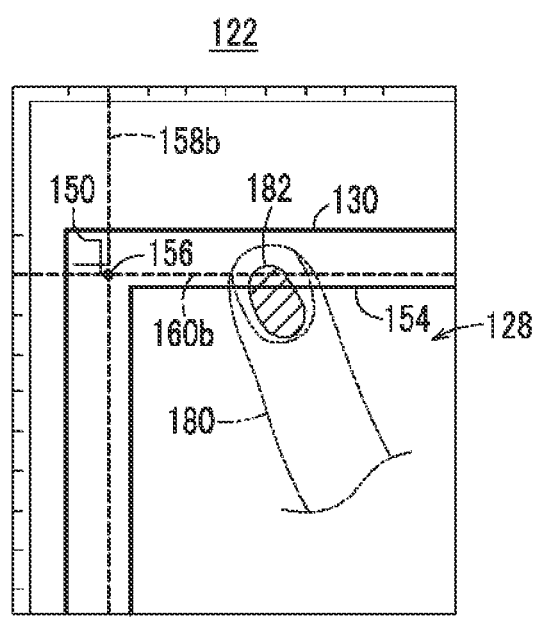
FIG. 12 is a schematic diagram showing an example of a screen operation using a touch sensor.

As shown in FIG. 12, the operator can designate a position on the preview image 122 by touching the display unit 56 with a fingertip 180 or by bringing the fingertip 180 close to the display unit 56. The hatched closed region corresponds to a contact part 182 on the display screen. As can be understood from FIG. 12, since position detectability or spatial resolution in the case of an instruction input using the touch sensor is low compared with that in the case using the cursor 152 of the present embodiment (FIG. 6A and the like), it is difficult to adjust the amount of movement of the frame image 154.

Therefore, the operation of matching the frame image 154 to the reference position becomes very easy by applying the "adsorption process" described above. This is even more preferable in terms of support for the operator.

In addition, it is needless to say that the present invention is not limited to the embodiment described above and can be freely changed without deviating from the subject matter of the present invention.

In the embodiment described above, the case has been illustrated in which the relative position (or the relative size) of the frame images 130 and 154 is changed by drag-and-drop operation. However, the present invention is not limited to this operation. The specific operation receiving section 76 may receive a series of operations that can be distinguished from other operations. For example, the specific operation receiving section 76 may receive an operation based on the combination of operations using a plurality of input devices.

What is claimed is:

1. An imposition apparatus that sets a page box for specifying a boundary of a page for each page region, comprising:
    a reference position determination unit that determines a reference position, which is specified by at least one point or one line, in the page region;
    a display unit that displays a preview image by superimposing a frame image, which shows the boundary of the page on a page image disposed in the page region, on the page image;
    an image change instruction unit that gives an instruction to change a relative position or a relative size of the frame image with respect to the page image in the preview image displayed by the display unit and an instruction to stop the change; and
    an image update unit that updates the preview image so that the frame image is in contact with the reference position determined by the reference position determination unit by performing an additional change when the stop instruction from the image change instruction unit is received.

2. The imposition apparatus according to claim 1, further comprising:
a distance determination unit that determines whether or not a distance between a stop position of the frame image and the reference position is less than a threshold value,
wherein the image update unit updates the preview image by further performing the additional change when the distance determination unit determines that the distance is less than the threshold value.

3. The imposition apparatus according to claim 1, further comprising:
a distance determination unit that determines whether or not a distance between a current position of the frame image and the reference position is less than a threshold value,
wherein the image update unit updates the preview image so as to change a display form according to a determination result of the distance determination unit.

4. The imposition apparatus according to claim 1,
wherein the image change instruction unit further gives an instruction regarding whether or not to allow the additional change, and
the image update unit updates the preview image by performing the additional change only when an instruction to allow the additional change is given by the image change instruction unit.

5. The imposition apparatus according to claim 2,
wherein the image change instruction unit further gives an instruction regarding whether or not to allow the additional change, and
the image update unit updates the preview image by performing the additional change only when an instruction to allow the additional change is given by the image change instruction unit.

6. The imposition apparatus according to claim 3,
wherein the image change instruction unit further gives an instruction regarding whether or not to allow the additional change, and
the image update unit updates the preview image by performing the additional change only when an instruction to allow the additional change is given by the image change instruction unit.

7. The imposition apparatus according to claim 1,
wherein, when a positioning mark is included in the page image, the reference position determination unit determines the reference position based on a position on the page image specified by the positioning mark.

8. The imposition apparatus according to claim 2,
wherein, when a positioning mark is included in the page image, the reference position determination unit determines the reference position based on a position on the page image specified by the positioning mark.

9. The imposition apparatus according to claim 3,
wherein, when a positioning mark is included in the page image, the reference position determination unit determines the reference position based on a position on the page image specified by the positioning mark.

10. The imposition apparatus according to claim 4,
wherein, when a positioning mark is included in the page image, the reference position determination unit determines the reference position based on a position on the page image specified by the positioning mark.

11. The imposition apparatus according to claim 1,
wherein the image change instruction unit is formed by a touch sensor that detects a contact position or a proximity position on a display screen provided in the display unit.

12. The imposition apparatus according to claim 2,
wherein the image change instruction unit is formed by a touch sensor that detects a contact position or a proximity position on a display screen provided in the display unit.

13. The imposition apparatus according to claim 3,
wherein the image change instruction unit is formed by a touch sensor that detects a contact position or a proximity position on a display screen provided in the display unit.

14. The imposition apparatus according to claim 4,
wherein the image change instruction unit is formed by a touch sensor that detects a contact position or a proximity position on a display screen provided in the display unit.

15. The imposition apparatus according to claim 7,
wherein the image change instruction unit is formed by a touch sensor that detects a contact position or a proximity position on a display screen provided in the display unit.

16. The imposition apparatus according to claim 1, further comprising:
a box position acquisition unit that acquires position information of the page box, which is specified in the preview image updated by the image update unit, so as to match the page region.

17. The imposition apparatus according to claim 2, further comprising:
a box position acquisition unit that acquires position information of the page box, which is specified in the preview image updated by the image update unit, so as to match the page region.

18. The imposition apparatus according to claim 16,
wherein the box position acquisition unit acquires the position information of the page box, which is specified in the preview image, so as to further match at least one page region that is not a display object of the preview image.

19. An imposition method of setting a page box for specifying a boundary of a page for each page region using a computer for the imposition apparatus according claim 1, comprising:
a step of determining a reference position, which is specified by at least one point or one line, in the page region;
a step of displaying a preview image by superimposing a frame image, which shows the boundary of the page on a page image disposed in the page region, on the page image;
a step of giving an instruction to change a relative position or a relative size of the frame image with respect to the page image in the displayed preview image and an instruction to stop the change; and
a step of updating the preview image so that the frame image is in contact with the determined reference position by performing an additional change when the stop instruction is received.

20. A non-transitory computer readable recording medium storing a program for setting a page box for specifying a boundary of a page for each page region to perform the method according to claim 19, the program causing a computer to execute:
a step of determining a reference position, which is specified by at least one point or one line, in the page region;
a step of displaying a preview image by superimposing a frame image, which shows the boundary of the page on a page image disposed in the page region, on the page image;

a step of giving an instruction to change a relative position or a relative size of the frame image with respect to the page image in the displayed preview image and an instruction to stop the change; and a step of updating the preview image so that the frame image is in contact with the determined reference position by performing an additional change when the stop instruction is received.

\* \* \* \* \*